No. 746,213. PATENTED DEC. 8, 1903.
A. J. WENTZEL.
DOUBLE BOILER.
APPLICATION FILED FEB. 25, 1903.
NO MODEL.
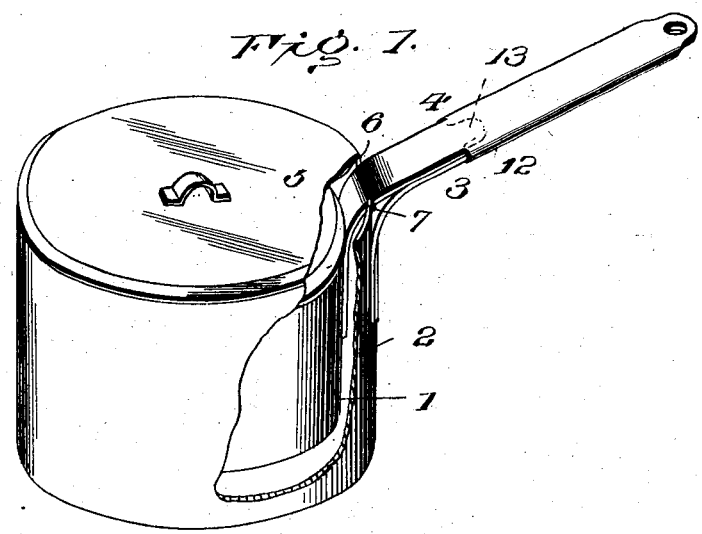
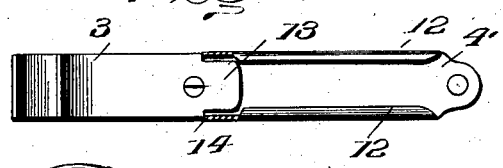
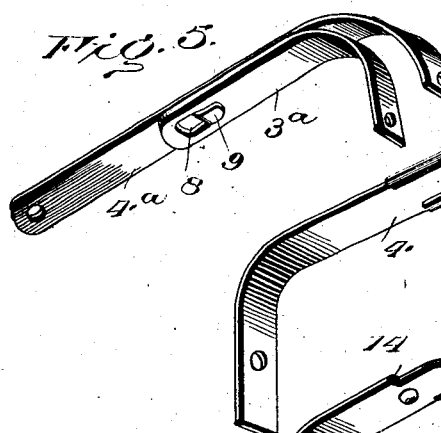
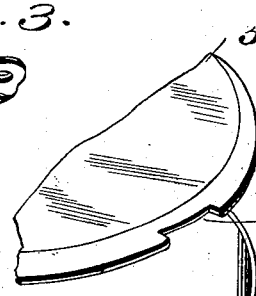
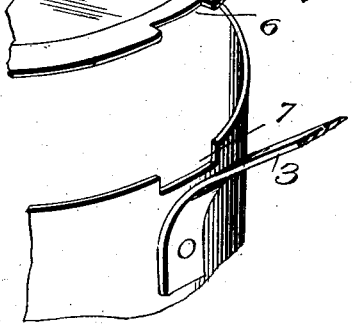
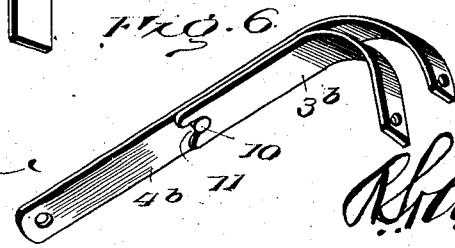
WITNESSES
INVENTOR
A. J. Wentzel
Attorneys.

No. 746,213. Patented December 8, 1903.

UNITED STATES PATENT OFFICE.

ANDREW J. WENTZEL, OF WEST SUPERIOR, WISCONSIN.

DOUBLE BOILER.

SPECIFICATION forming part of Letters Patent No. 746,213, dated December 8, 1903.

Application filed February 25, 1903. Serial No. 145,085. (No model.)

*To all whom it may concern:*

Be it known that I, ANDREW J. WENTZEL, a citizen of the United States, residing at West Superior, in the county of Douglas and State of Wisconsin, have invented certain new and useful Improvements in Double Boilers, of which the following is a specification.

This invention has for its object to devise a double boiler for cooking food involving novel structural features resulting in the provision of a utensil in which the inner vessel will be completely surrounded by the heating medium, thereby greatly facilitating the cooking process and enabling independent use of the vessels when required.

The invention consists, essentially, of two vessels each provided with a lateral handle, the smaller vessel being adapted to be suspended within the larger vessel by means of its handle, which rests upon and projects beyond the handle of the outer vessel to be conveniently grasped, the handles of the two vessels being adapted to normally interlock by a longitudinal sliding movement of the one upon the other.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a double boiler embodying the invention, parts being broken away to show more clearly the structural details. Fig. 2 is a view of the handles detached and inverted, showing more clearly the interlocking means. Fig. 3 is a detail perspective view of the handle of the inner vessel. Fig. 4 is a detail perspective view of the handle of the outer vessel. Figs. 5 and 6 show modifications of the handles. Fig. 7 is a detail perspective view of a portion of the outer vessel and its cover, showing clearly the notches formed therein to provide an opening for the passage of the handle of the inner vessel, the parts being detached.

Corresponding and like parts are referred to in the following description and indicated in all the views of the drawings by the same reference characters.

The boiler comprises two vessels 1 and 2, the same being of any size, shape, or construction. The vessel 1 is suspended within the vessel 2 so as to be spaced therefrom at its bottom, top, and sides, whereby it is completely enveloped by the heating medium, so as to attain all the advantages of the invention. The outer vessel 2 is provided with a handle 3, and the inner vessel 1 is provided with a similar handle 4, which in practice is of greater length than handle 3, so as to project beyond same and admit of vessel 1 being readily removed or placed within vessel 2 without interference of handle 3 therewith. The handle 4 is longer than and rests upon handle 3 and supports vessel 1 within vessel 2, the two vessels being held in determinate position by interlocking means between the handles 3 and 4. Each of the vessels is closed by a cover, which may be of any construction so as to make a comparatively close joint. The cover 5 of vessel 2 is notched at one edge, as shown at 6, to provide clearance for handle 4, and the upper edge of vessel 2 is correspondingly notched, as shown at 7, to receive handle 4 and act in conjunction with the interlocking means between the two handles to hold vessel 1 in proper position. The notches 6 and 7 are of such size as to admit of a snug opening being formed for the passage of handle 4.

The handles 3 and 4 are sufficiently stout to admit of manipulation of the boiler or either vessel comprising same and are riveted or otherwise secured to the respective vessels in any substantial manner. The handle 4 has the longitudinal edge portions of the part projecting beyond the handle 3 recurved, as shown at 12, and the outer end of the handle 3 is reduced in width to form a tongue 13 to enter the space formed between the recurved edge portions 12 and the body of the handle, shoulders 14 being provided at the base of the tongue 13 to limit the sliding movement of handle 4 upon handle 3 when placing vessel 1 within vessel 2.

In the construction shown in Fig. 5 the interlocking means between the handles 3ª and 4ª consist of opening 8 in handle 3ª and tongue 9 pressed from handle 4ª and adapted to enter the opening 8 and underlap handle 3ª, so as to prevent upward movement of the outer end of handle 4ª by the weight of the vessel 1.

In the construction shown in Fig. 6 the handle 4ᵇ is provided with a headed stud 10, and the end of handle 3ᵇ is provided with notch 11 to receive headed stud 10. The stud 10 may be secured to the handle 4ᵇ in any way, and the notch 11 flares toward its outer end to facilitate the entrance of the stud therein, as will be readily comprehended.

A double boiler embodying the invention is exceedingly cheap in construction, admits of the complementary vessels 1 and 2 being independently used, and enables the cooking to be effected in less time than cooking utensils of this type in which the inner vessel has a portion exposed to the outer air. The inner vessel is completely enveloped by a moist heating medium. Hence the food being cooked is prevented from burning or crusting. The vessels are free from inner rims or overhanging portions, which preclude the successful independent use of the outer or inner vessel or boiler of cooking utensils of the aforementioned type as commonly constructed.

Within the purview of the invention it is not necessary that the cover or edge of the outer vessel be notched to receive the handle of the inner vessel, as the two handles lie sufficiently close to admit of the cover making a tight joint.

In all forms of the handles the upper one is considerably longer than the lower one and extends beyond the outer end thereof a distance to be conveniently grasped when placing vessel 1 within vessel 2 or removing same therefrom. An important feature is the interlocking of the two handles by a longitudinal movement of the upper handle on the lower handle, same being effected at one operation when placing vessel 1 within vessel 2. The unlocking is accomplished by a single movement when lifting vessel 1 from vessel 2 by sliding the upper handle out upon the lower handle. By having the longitudinal edge portions of the handle 4 recurved, as stated, a rounded grip is formed to prevent injury to the hand, and the outer portion is stiffened, as well as guides provided to receive the end or tongue 13 of the handle 3, which is protected thereby.

Having thus described the invention, what is claimed as new is—

1. In a double boiler, an outer vessel having a lateral handle, an inner vessel having a corresponding lateral handle to rest upon and project beyond the handle of the outer vessel to hold the inner vessel in suspension and to be conveniently grasped, and positive interlocking means between the two handles coupled and uncoupled by a longitudinal sliding movement of the upper handle upon the lower handle when placing the inner vessel in position or removing it from the outer vessel, substantially as described.

2. A double boiler comprising an outer vessel having a lateral handle near its upper edge and a notch in said upper edge adjacent to the handle, an inner vessel having a lateral handle to overlap and rest upon the handle of the outer vessel and pass through the notch thereof, interlocking means between the two handles, and a cover for the outer vessel extending over the inner vessel and having a notch in an edge to match with the notch of the outer vessel to provide clearance for the handle of said inner vessel, substantially as set forth.

3. In a double boiler, an outer vessel having a lateral handle, an inner vessel having a lateral handle to rest upon the handle of the outer vessel to hold the inner vessel in suspension, the upper handle projecting beyond the lower handle and having the longitudinal edge portions of the projecting portion recurved to stiffen same and form a rounded grip, the inner ends of the recurved longitudinal edge portions receiving and embracing the outer end of the lower handle to form interlocking means between the two handles, substantially as set forth.

4. In a double boiler, an outer vessel having a lateral handle reduced in width near its outer end to form a tongue and shoulders at the base of the tongue, an inner vessel having a handle to rest upon the handle of the outer vessel to hold the inner vessel in suspension, the upper handle projecting beyond the lower handle and having the longitudinal edge portions of the projecting portion recurved to stiffen same and form a rounded grip, the inner ends of the recurved longitudinal edge portions receiving and embracing the tongue at the outer end of the lower handle to form interlocking means between the two handles, substantially as specified.

In testimony whereof I affix my signature in presence of two witnesses.

ANDREW J. WENTZEL. [L. S.]

Witnesses:
W. L. BEARDSLEY,
T. L. McINTOSH.